United States Patent [19]

Akagi et al.

[11] 4,366,835

[45] Jan. 4, 1983

[54] ELECTROMAGNETIC FLOW CONTROL VALVE

[75] Inventors: Motonobu Akagi, Kariya; Isshi Nomura, Aichi, both of Japan

[73] Assignee: Aisin Seiki Kabushiki Kaisha, Kariya, Japan

[21] Appl. No.: 232,352

[22] Filed: Feb. 6, 1981

[30] Foreign Application Priority Data

Feb. 29, 1980 [JP] Japan ................................ 55-25886

[51] Int. Cl.[3] ........................ F16K 31/08; F02M 23/00

[52] U.S. Cl. .................................... 137/495; 251/130; 251/65; 123/587; 137/DIG. 8

[58] Field of Search .................. 251/130, 65; 137/495, 137/DIG. 8; 123/587

[56] References Cited

U.S. PATENT DOCUMENTS 3,635,240 1/1972 Vischulis et al. .................. 137/495

4,286,767 9/1981 Hashimoto ...................... 251/129 X

*Primary Examiner*—Arnold Rosenthal

*Attorney, Agent, or Firm*—Oblon, Fisher, Spivak, McClelland & Maier

[57] ABSTRACT

A flow control valve for mounting on the intake manifold of an internal combustion engine for controlling a by-pass passage supplying air to the intake manifold of the engine by operating a solenoid in response to output signals from an $O_2$ sensor located in the exhaust manifold. A casing which is mounted on the intake manifold to form the by-pass passage is interiorly provided with a movable member which is operated by energization and de-energization of the solenoid and biased to abut against a fixed member in the casing by the action of a first spring when the solenoid is in the de-energized state. Further provided in the casing are a slide member which is slidable along the fixed member and a pressure chamber defined by the diaphragm one peripheral edge of which is secured to the slide member, the pressure chamber being communicated with the intake manifold to receive the intake manifold vacuum therein. The slide member is biased by a second spring and pushed forward to retract the movable member against the action of the first spring and to complete the by-pass passage through the casing when the engine is switched off or when atmospheric pressure prevails in the intake manifold. During operation of the internal combustion engine, the intake manifold vacuum is admitted into the pressure chamber, retracting the slide member against the action of the second spring to free the first spring.

3 Claims, 3 Drawing Figures

ELECTROMAGNETIC FLOW CONTROL VALVE

BACKGROUND OF THE INVENTION

1. Field of the Invention

This invention relates to a valve for electrically controlling the flow rate of a fluid to be supplied from a fluid source to a point of demand for the fluid, and more particularly to a flow control valve which controls the flow rate according to the demand point and which draws in the pressure of the demand point at which a pressure drop below the level of the fluid source occurs under operating conditions, normally maintaining the control valve in an open state as soon as the pressure drop at the demand point is eliminated.

2. Description of the Prior Art

For the purpose of burning combustible gases or decomposing nitrogen oxides in the exhaust gas resulting from operation of an internal combustion engine, it is the practice in the art to control the quantity of air to be mixed with the fuel, generally by means of an electric flow control valve system which supplies air from a by-pass passage to the intake manifold of the engine through a flow control valve according to output signals of a control circuit operating on signals received from an $O_2$ sensor located in the exhaust manifold. This sort of flow control valve system, for the necessity of supplying a large quantity of air at the time of starting the engine, adds to the control by the output of the $O_2$ sensor a control of the flow control valve according to the intake manifold vacuum of the engine by drawing the vacuum into a pressure chamber of the valve.

In the conventional electric flow control valve system of the type mentioned above, the control valve is normally held in a closed state by a biasing force of a spring and, when the intake manifold vacuum of the engine is increased such as, for example, of engine starting, opened by the vacuum prevailing in its pressure chamber. When the engine is not in operation, the control valve is closed since no vacuum exists in the intake manifold of the engine. Therefore, there is a possibility of the control valve being frozen in the closed state while the engine is left off in a cold region or climate, failing to open when vacuum is produced in the intake manifold due to starting of the engine.

SUMMARY OF THE INVENTION

It is an object of the present invention to provide an electric flow control valve of the type mentioned above for controlling air supply to an internal combustion engine, in which the valve is maintained in an open state when no vacuum exists in its pressure chamber.

According to the present invention, there is provided an electromagnetic flow control valve for controlling the flow rate of a fluid through a fluid passage between a fluid source and a point of demand for the fluid at which a pressure lower than the level of the fluid source prevails under operating conditions, the flow control valve including a casing formed with openings in communication with the fluid source and the point of demand, respectively, an electromagnetic operating mechanism provided in the casing and having a fixed member located fixedly in the casing and a movable member, moving the movable member toward and away from the fixed member upon energization and de-energization, a hollow cylindrical wall provided in the casing with the longitudinal axis thereof being disposed in the direction of movement of the movable member and having an inner cavity in communication with either one of the openings, valve elements formed at opposing ends of the movable member and the cylindrical wall for completing or blocking a fluid passage leading from one to the other opening through the inner cavity of the cylindrical wall and casing, a first spring biasing the movable member to urge the valve element on the movable member into abutting engagement with the valve element on the cylindrical wall, a diaphragm having the inner peripheral edge thereof secured to a slide member on the outer periphery of the cylindrical wall and the outer peripheral edge to the inner peripheral wall of the casing to define a pressure chamber in communication with the needing point, the slide member being slidable axially toward and away from the movable member, and a second spring provided in the pressure chamber and biasing the slide member into abutting engagement with the movable member, the second spring abutting the slide member against the movable member when no pressure is admitted into the pressure chamber in the de-energized state of the electromagnetic operating mechanism, maintaining the valve elements in open positions against the biasing action of the first spring.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENT

Reference is now made to the accompanying drawings illustrating an electric flow control valve of the type which operates according to the intake manifold vacuum of an internal combustion engine.

Figure 1A:
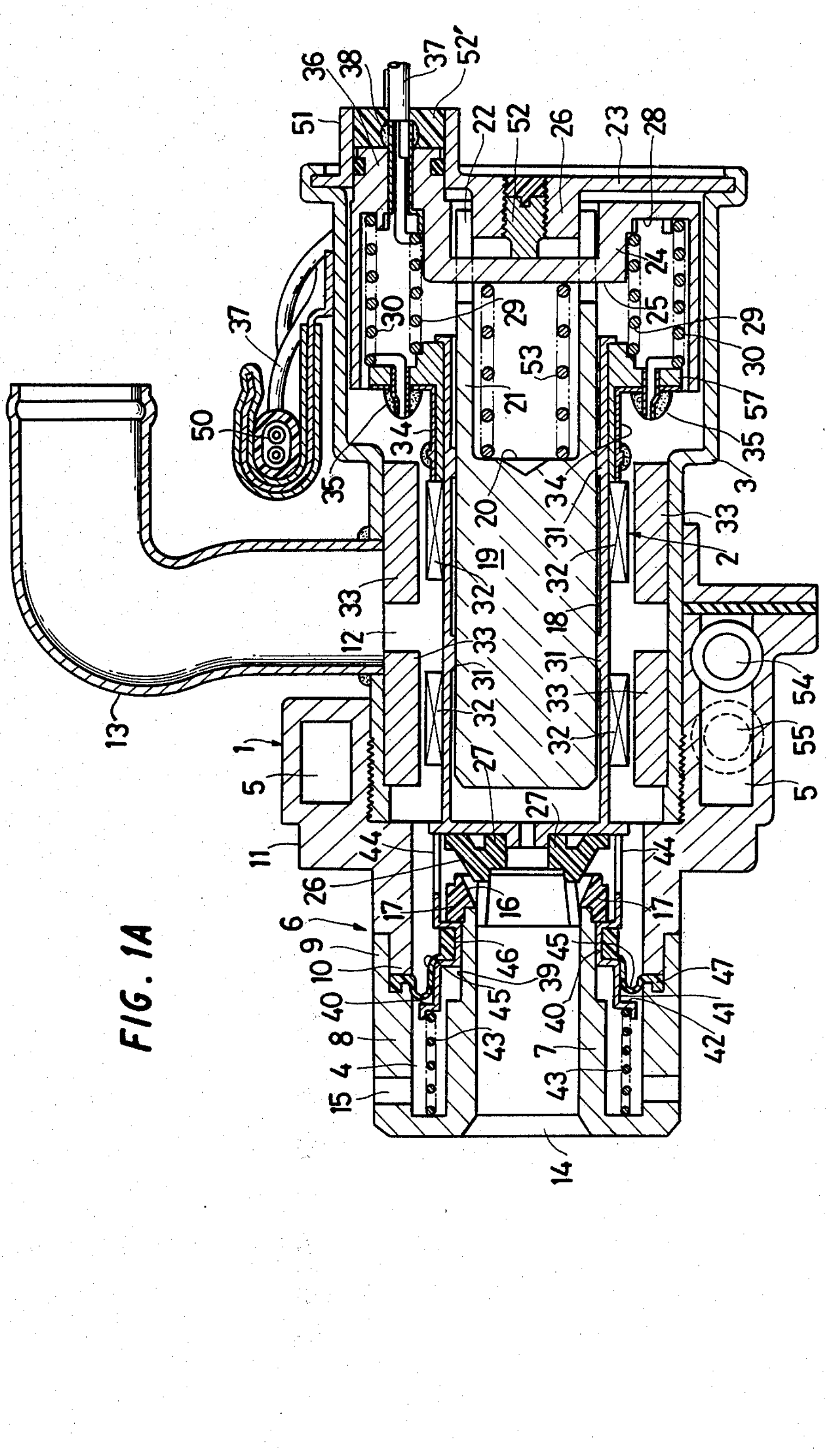
FIGS. 1A and 1B are a diagrammatic sectional views of an embodiment of the present invention during two different stages of operation.
Figure 1B:
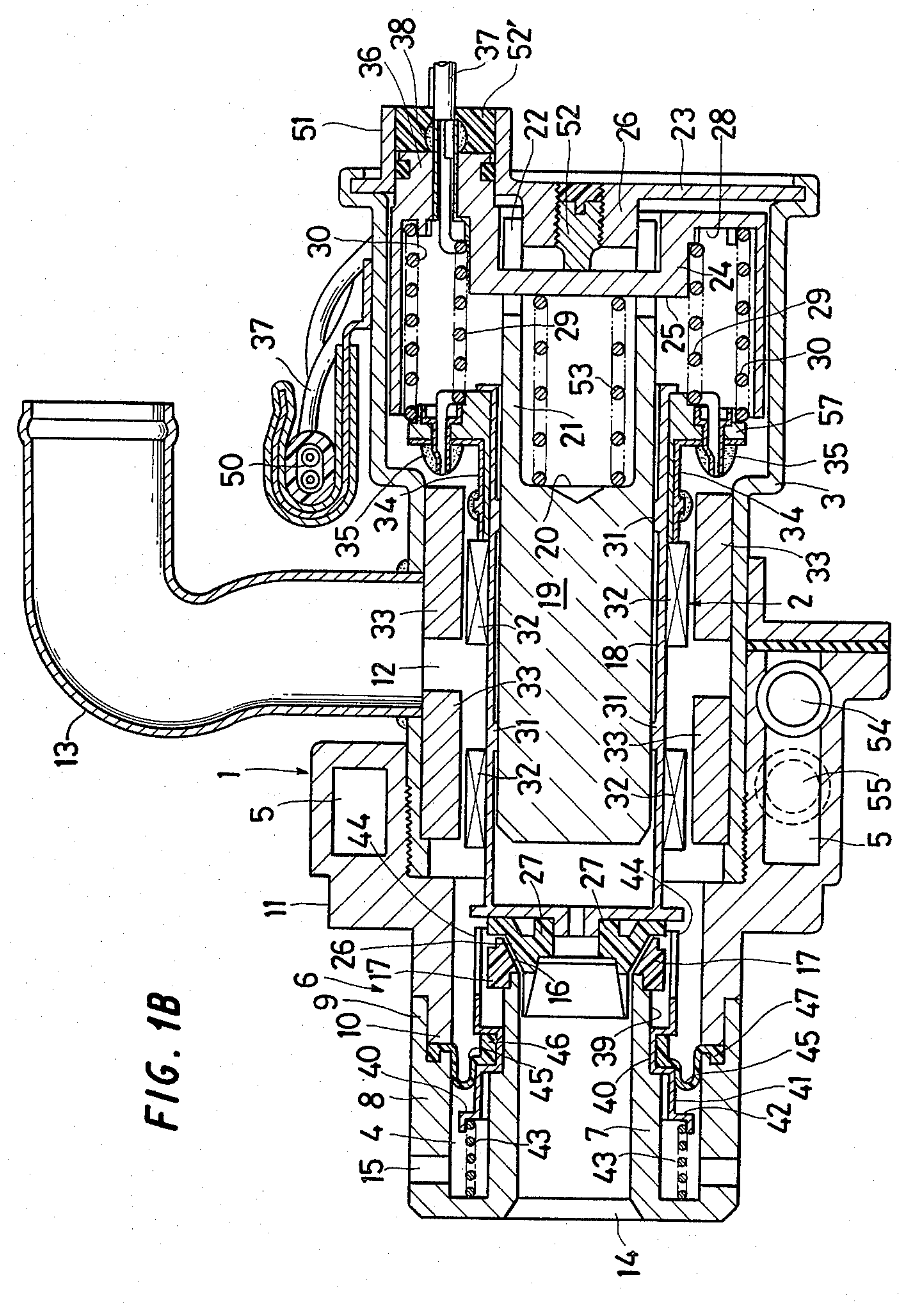

Referring first to FIGS. 1A and 1B, a casing indicated by reference number 1 includes a stepped cylinder 3 of aluminum or an aluminum alloy closed at one end and accommodating a fixed element and a movable element of an electromagnetic operating mechanism 2, and a cylinder 6 defining a pressure chamber 4 and a hot water passage 5. Cylinder 6 is a casting of aluminum or an aluminum alloy including an end cylinder portion 8 in the form of a bottomed annular cylinder having a hollow cylindrical wall 7 coaxial therewith to define the pressure chamber 4 and an axial cylinder portion 11 having at one end a stepped portion 10 in engagement with a counter-stepped portion 9 of the end cylinder portion 8 and fitted on the cylinder 3 at the other end which has the hot water passage 5.

Figure 2:
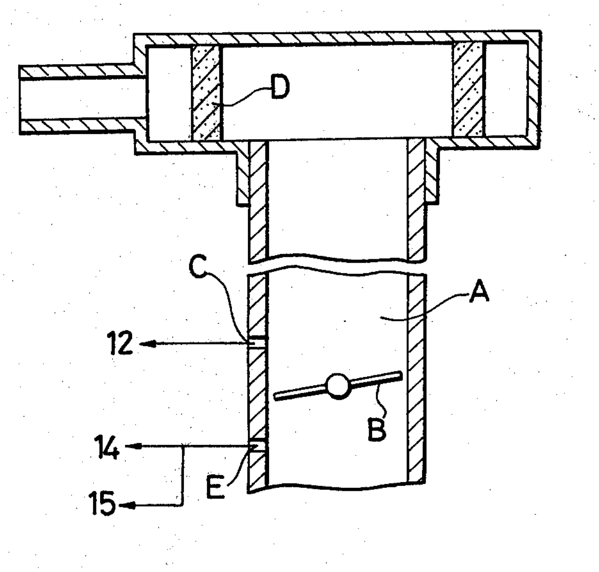
FIG. 2 is a diagrammatic view showing an example of application of the valve according to the invention.

Stepped cylinder 3 of the casing 1 is provided with an opening 12 in its side wall in communication through a pipe 13 with an opening C which is provided in an air intake passage A of the internal combustion engine at a position upstream of a throttle valve B, to admit cleaned air into the casing 1 through an air filter D (see FIG. 2). On the other hand, an opening 14 of the cavity of the cylindrical wall 7 at the outer end of the end cylinder portion 8 and an opening 15 formed in the wall of the pressure chamber 4 of bottomed annular shape are communicated with an opening E which is provided on the downstream side of the throttle valve B in the air intake passage A of the engine, receiving the intake manifold vacuum in the openings 14 and 15 (see FIG. 2).

The free end of the cylindrical wall 7 which is extended inward of the casing 1 from the outer end of the end cylinder portion 8 is provided with a valve element 17 of a synthetic resin material securely fixed thereto which is formed in an annular shape with a conical valve face 16 on the inner periphery thereof. Valve face 16 is intimately engageable with a conical valve face 26 on the outer periphery of a valve element 27 which is secured to a fore end of a movable member 18 of the electromagnetic operating mechanism 2 and is made of synthetic resin material hereinafter. Communication between the aforementioned openings 12 and 14 through the fluid passage in the casing 1 is established and blocked by disengagement and engagement of the valve elements 17 and 27.

A cylindrical iron core 19 of the electromagnetic operating mechanism 2 is provided in the axial direction of the stepped cylinder 3, coaxially with the cylindrical wall 7. Iron core 19 has in one end portion a cylindrical wall 21 with a bottomed center bore 20, the free end of the cylindrical wall 21 being formed with a plurality of notches to provide a plurality of support legs 22. Support legs 22 are inserted into bores in a support disc 24 which is slidably fitted in a lid member 23 of the stepped casing 3. Support legs 22 are guided by the cylindrical indented wall of an inner land 25 of the support disc 24 and a cylindrical projection 26 of the lid member 23, thereby maintaining the axial alignment of the iron core 19.

Movable member 18 is slidably fitted on the outer periphery of the iron core 19 in the axial direction of the iron core, and has a flange 57 of a synthetic resin material fixedly secured on one end thereof, coaxially interposing coil springs 29 and 30 between the flange 57 and an annular receptacle 28 of the support disc 24 to thereby urge the movable member 18 toward the cylindrical wall 7.

Movable member 18 is provided on its inner wall with annular projections 31 in a direction perpendicular to its longitudinal axis for low friction sliding movement of the movable member 18 on the outer periphery of the iron core 19. Securely mounted on the outer periphery of the movable member 18 are solenoid coils 32 which are opposingly positioned to permanent magnets 33 fixed on the inner periphery of the stepped cylinder 3. Upon energizing the solenoid coils 32 through the coil springs 29 and 30 which also serve as conducting wires, movable member 18 is displaced to the right in FIGS. 1A and 1B against the forces of the coil springs 29 and 30. As shown in FIGS. 1A and 1B, one end of each of the coil springs 29 and 30 which are bent in the axial direction of the iron core 19 are passed through the flange 57 with insulators and soldered at 35 to lead wires 34 of the solenoid coils 32. The other ends of the spring 29 and 30 are passed with insulation through a cylindrical wall portion 36 which is provided at one side of the support disc 24 and which abuts seal 52′, and soldered at 38 to external lead wires 37. The external lead wires 37 are connected to a control circuit (not shown) through a socket 50 which is insulatingly supported on the outer side of the stepped cylinder 3.

Cylindrical wall 7 is provided with an annular recess 39 on its outer periphery, slidably receiving thereon a slide member 41 in contact with the bottom wall of its annular projecting wall 40. A coil spring 43 is interposed between a collar 42 at one end of the slide member 41 and the bottom surface of the pressure chamber 4, urging the other end of the slide member 41 into abutting engagement with the fore end of the movable member 18 on the outer side of the valve elements 17 and 27. The resilient force of the coil spring 43 is greater than the coil springs 29 and 30, which bias movable member 18, so that the valve faces 16 and 26 of the valve elements 17 and 27 are disengaged from each other when the electromagnetic operating mechanism 2 is in de-energized state and there is no pressure difference between the openings 12 and 14, maintaining the openings 12 and 14 in fluid communication with each other. For this purpose, a notch 44 is provided at the free end of the slide member 41 which is to be abutted against the movable member 18.

Fitted air-tightly in the annular groove of the projecting wall 40 of the slide member 41 is an inner edge 46 of an annular diaphragm 45 the outer edge 47 of which is securely fixed between end walls of joined stepped portions 9 and 10 of the end cylinder portion 8 and the axial cylinder portion 11, the diaphragm 45 defining the pressure chamber 4 in the inner cavity of the end cylinder portion 8. As the intake manifold vacuum at the opening E downstream of the throttle valve B of the air intake passage A is transmitted to the opening 15 of the pressure chamber 4, diaphragm 45 is deformed and the slide member 41 is displaced to the left in FIGS. 1A and 1B against the biasing force of the coil spring 43, disengaging the slide member 41 from the fore end of the movable member 18.

FIG. 1A shows the positions of the iron core 19, the slide member 41 and movable member 18 when the intake manifold vacuum is not present in pressure chamber 4. FIG. 1B shows the positions of iron core 19, slide member 41 and movable member 18 when the intake manifold vacuum is admitted in chamber 4. In the same Figures, designated at reference number 51 is a cylindrical wall of the lid member 23 which is fitted on the cylindrical wall 36 of the support disc 24, at 52 a screw which is threaded into the inner land 26 of the lid member 23 with its fore end in abutting engagement with the outer side of the indented wall portion 25 of the support disc 24, at 53 a return spring for the iron core 19, at 54 an inlet of the hot water passage 5, and at 55 an outlet of the hot water passage 5.

For mounting the valve device of the invention with the above-described construction, cylinder 6 is inserted into the intake manifold until stopped by abutment thereagainst into the stepped wall of the hot water passage 5. As soon as a control signal is applied to the solenoid coils 32 according to the output of an $O_2$ sensor or the like, movable member 18 is displaced to the right in FIGS. 1A and 1B against the actions of the springs 29 and 30 to open the valve faces 16 and 26, forming a by-pass passage between A and E of the intake passage via pipe 13, opening 12, inner cavity of the casing 1, a passage between the valve faces 16 and 26, inner cavity of the cylindrical wall 7 and opening 14 thereby supplying air to the intake manifold according to control signals from an $O_2$ sensor or other control mechanisms. In this instance, slide member 41 which is slidably mounted on the outer periphery of the cylindrical wall 7 is pressingly abutted against the fore end of the movable member 18 by the action of spring 43. Since the resilient force of the spring 43 is greater than the springs 29 and 30, movable member 18 is moved to the right in FIGS. 1A and 1B by the force of the spring 43 applied on the slide member 41 against the actions of the springs 29 and 30, holding the valve face 26 of the valve element 27 in the open position disengaged from the valve face 16 of the valve element 17 (the position shown on the upper side of FIG. 1B) when the electromagnetic mechanism is in the de-energized state and the intake manifold vacuum at the opening E is not prevailing in the pressure chamber 4, namely, when the engine is not in operation. As vacuum is produced in the intake manifold upon starting the engine, it is admitted into the pressure chamber 4 through the opening 15 and operates the diaphragm 45 to displace the slide member 41 to the left in FIGS. 1A and 1B into the position shown in FIG. 1A.

Similarly to the conventional flow control valves, in order to supply the intake manifold with a small quantity of air through the by-pass passage at the time of engine start, a small gap is formed between the opposing faces 16 and 26 of the valve elements 17 and 27 when the intake manifold vacuum is in communication with the pressure chamber 4 and no operating signal is applied to the electromagnetic operating mechanism 2.

In the conventional flow control valves, the opposing faces of the valve elements are left in the small gap displacement relation with each other when the engine is not in operation. Therefore, difficulty is sometimes encountered when starting the engine in a cold region or climate since the valve elements are frozen up by water vapor which condenses on the opposing faces of the valve elements when the engine is switched off for a long period of time. In such case, even if a signal is applied to the electromagnetic operating mechanism, the engine cannot be restarted until the valve members are unfrozen. The flow control valve of the present invention is free of such starting difficulties since the vacuum in the pressure chamber disappears upon stopping the engine and the slide member 41 abuts against the movable member 18 due to the force of the spring 43, disengaging the face 26 of the valve element 27 from the face 16 of the valve element 17.

The above-described construction of the flow control valve according to the present invention is thus suitable for use in a conduit leading from a fluid source to a point where the pressure drops below the level of the fluid source upon initiation of operation, holding the valve elements in open positions under non-operating conditions. When the pressure at the point of demand of the fluid is equivalent to the level of the fluid source, namely, under non-operating conditions, the pressure in the pressure chamber defined by the diaphragm is at the same level as in the valve casing, so that the slide member abuts against the movable member of the electromagnetic operating mechanism by the biasing force of the second spring and pushes the movable member against the force of the first spring, disengaging the valve elements from each other at the meeting ends of the slide member and the cylindrical wall to open the valved fluid passage across the two openings in the valve casing. Therefore, the fluid is supplied from the fluid source to the point of demand whenever it is put in an operating state.

As the point of demand for the fluid is put in operation and the reduced operating pressure prevails in the pressure chamber, the diaphragm is deformed by the operating pressure to retract the slide member away from the movable member against the action of the second spring. Now that the movable member of the electromagnetic operating mechanism is biased only by the force of the first spring in opening and closing the valve elements formed at the opposing ends of the movable member and the wall of the end casing. Thus, upon conducting an electric signal through the electromagnetic operating mechanism, the movable member is retracted against the force of the first spring due to the electromagnetic action between the movable and fixed members, and upon termination of the electric signal, the movable member is returned by the biasing action of the first spring, thereby opening and closing the valve elements to control the flow rate of fluid from the fluid source to the point in need of the fluid through the passage between the valve elements in proportion to the applied signals.

To summarize, the present invention provides a flow control valve having the valve elements on a cylindrical wall formed in the valve casing and a movable member of an electromagnetic operating mechanism which is movable axially within the valve casing and biased by a first spring to urge the valve elements into abutting engagement with each other in the absence of electromagnetic action between the movable member and a fixed member of the electromagnetic operating mechanism, while biasing the slide member by a second spring to hold the valve elements in disengaged positions apart from each other under non-operating conditions. When the point of demand of the fluid is put in an operational condition, the slide member is retracted against the action of the second spring into a position out of the way of the operation of the electromagnetic mechanism. Therefore, freezing of the valve elements or other restarting problems are prevented even after the point of demand for the fluid is left in the non-operating condition for a long period of time, smoothly supplying the fluid to the position of demand upon restart of the operation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electromagnetic flow control valve for controlling the flow rate of a fluid through a fluid passage between a fluid source and a point of demand for the fluid at which a pressure lower than the level of the fluid source prevails under operating conditions, said valve comprising:

a casing formed with a first opening communicating with said fluid source and a second opening communicating with said point of demand for the fluid;

electromagnetic operating means provided in said casing and including a fixed member fixedly located in said casing and a movable member, moving said movable member toward and away from said fixed member under an energization and de-energization state;

a hollow cylindrical wall provided in said casing, the longitudinal axis thereof being disposed in the direction of movement of said movable member and having an inner cavity in communication with either said first and second opening;

a plurality of valve elements formed at the opposing ends of said movable member and cylindrical wall for completing or blocking a fluid passage leading from one to the other of said first and second opening through the inner cavity of said cylindrical wall and said casing;

a first spring biasing said movable member to urge said valve elements on said movable member into abutting engagement with the valve element on said cylindrical wall;

a slide member mounted on said cylindrical wall;

a diaphragm having the inner peripheral edge thereof secured to said slide member on the outer periphery of said cylindrical wall and the outer peripheral edge to the inner peripheral wall of said casing to define a pressure chamber in communication with said point of demand, said slide member being slidable axially toward and away from said movable member; and a second spring provided in said pressure chamber and biasing said slide member into abutting engagement with said movable member;

said second spring abutting said slide member against said movable member when no pressure is admitted into said pressure chamber in the de-energized state of said electromagnetic operating means, maintaining said valve elements in open positions against the biasing action of said first spring.

2. An electromagnetic valve as set forth in claim 1, wherein said first opening is in communication with said point of demand for the fluid and said second opening is in communication with said fluid source.

3. An electromagnetic valve as set forth in claim 1, further comprising a fluid passage connecting said first opening with said second opening through the inner cavity of said cylindrical wall and said casing forms a by-pass passage between said fluid source and said point of demand.

* * * * *